(12) United States Patent
Rofougaran

(10) Patent No.: US 8,018,913 B2
(45) Date of Patent: *Sep. 13, 2011

(54) METHOD AND SYSTEM FOR SHARING COMPONENTS IN A TIME DIVISION MULTIPLEX WIRELESS SYSTEM

(75) Inventor: Ahmadreza Rofougaran, Newport Castle, CA (US)

(73) Assignee: Broadcom Corporation

( * ) Notice: Subject to any disclaimer, the term of this patent is extended or adjusted under 35 U.S.C. 154(b) by 1173 days.

This patent is subject to a terminal disclaimer.

(21) Appl. No.: 11/536,644

(22) Filed: Sep. 29, 2006

(65) Prior Publication Data

US 2008/0080450 A1 Apr. 3, 2008

(51) Int. Cl.
*H04W 4/00* (2009.01)
(52) U.S. Cl. ........ 370/347; 370/337; 370/342; 455/450; 455/555
(58) Field of Classification Search ............... 370/310.1, 370/314, 321, 347, 344, 337, 342; 455/450, 455/555
See application file for complete search history.

(56) References Cited

U.S. PATENT DOCUMENTS

| | | | | |
|---|---|---|---|---|
| 5,426,641 | A * | 6/1995 | Afrashteh et al. | 370/347 |
| 5,536,415 | A | 7/1996 | Miller et al. | |
| 5,878,332 | A * | 3/1999 | Wang et al. | 455/84 |
| 6,112,062 | A * | 8/2000 | Hans et al. | 455/114.3 |
| 6,138,010 | A * | 10/2000 | Rabe et al. | 455/426.1 |
| 7,395,056 | B2 * | 7/2008 | Petermann | 455/422.1 |
| 2001/0016023 | A1 * | 8/2001 | Roy et al. | 375/372 |
| 2001/0031621 | A1 * | 10/2001 | Schmutz | 455/7 |
| 2002/0015423 | A1 * | 2/2002 | Rakib et al. | 370/485 |
| 2002/0172162 | A1 * | 11/2002 | Goodings | 370/280 |
| 2003/0109240 | A1 * | 6/2003 | Zipper | 455/323 |
| 2004/0136473 | A1 * | 7/2004 | Yang et al. | 375/322 |
| 2004/0208157 | A1 * | 10/2004 | Sander et al. | 370/345 |
| 2005/0020299 | A1 * | 1/2005 | Malone et al. | 455/552.1 |
| 2005/0124362 | A1 * | 6/2005 | Pecen et al. | 455/502 |
| 2005/0128978 | A1 * | 6/2005 | Pecen et al. | 370/329 |
| 2005/0266811 | A1 | 12/2005 | Weiss | |
| 2006/0057995 | A1 * | 3/2006 | Chien | 455/260 |
| 2006/0084469 | A1 | 4/2006 | Malone et al. | |
| 2006/0114836 | A1 * | 6/2006 | Pollin et al. | 370/252 |

(Continued)

FOREIGN PATENT DOCUMENTS

CN 1751457 A 3/2006

(Continued)

OTHER PUBLICATIONS

EPO Communication dated Mar. 25, 2011 in Application No. 07006729.3-2411/1906537.

*Primary Examiner* — Pierre-Louis Desir
(74) *Attorney, Agent, or Firm* — McAndrews, Held & Malloy, Ltd.

(57) ABSTRACT

A method and system for sharing components in a time division multiplex wireless system is provided. The method may include configuring at least one component of a software programmable radio, such as a PLL, to enable communication of data using, for example, a GSM protocol during a first timeslot in a frame and reconfiguring that component to enable communication of data using a different communication protocol during an unused timeslot in the same frame. Both uplink and downlink channels of the different communication protocol may be communicated during the unused timeslots.

30 Claims, 5 Drawing Sheets

U.S. PATENT DOCUMENTS

| | | | |
|---|---|---|---|
| 2006/0168587 A1* | 7/2006 | Aslam-Mir | 718/105 |
| 2007/0001813 A1* | 1/2007 | Maguire et al. | 340/10.2 |
| 2007/0025471 A1* | 2/2007 | Chen et al. | 375/316 |
| 2007/0049213 A1* | 3/2007 | Tran | 455/78 |
| 2007/0049216 A1* | 3/2007 | Karaoguz | 455/90.3 |
| 2007/0060071 A1* | 3/2007 | Rafi et al. | 455/76 |
| 2007/0173202 A1* | 7/2007 | Binder et al. | 455/68 |
| 2007/0238483 A1* | 10/2007 | Boireau et al. | 455/553.1 |
| 2007/0259628 A1* | 11/2007 | Carmel et al. | 455/127.1 |
| 2007/0268888 A1* | 11/2007 | Shatzkamer et al. | 370/352 |
| 2008/0007333 A1* | 1/2008 | Lee et al. | 330/136 |
| 2008/0037541 A1* | 2/2008 | Souissi et al. | 370/392 |
| 2008/0037656 A1* | 2/2008 | Hannuksela | 375/240.26 |
| 2009/0093272 A1* | 4/2009 | Saarisalo et al. | 455/558 |

FOREIGN PATENT DOCUMENTS

| | | |
|---|---|---|
| KR | 20010078104 | 8/2001 |
| KR | 20030006051 | 1/2003 |
| KR | 10 2004 101515 | 12/2004 |
| WO | W02005101677 | 10/2005 |
| WO | WO 2006/029082 | 3/2006 |

* cited by examiner

METHOD AND SYSTEM FOR SHARING COMPONENTS IN A TIME DIVISION MULTIPLEX WIRELESS SYSTEM

CROSS-REFERENCE TO RELATED APPLICATIONS/INCORPORATION BY REFERENCE

This application makes reference to: U.S. application Ser. No. 11/536,678, filed on even date herewith; U.S. application Ser. No. 11/536,682, filed on even date herewith; U.S. application Ser. No. 11/536,650, filed on even date herewith; U.S. application Ser. No. 11/536,676, filed on even date herewith; U.S. application Ser. No. 11/536,659, filed on even date herewith; U.S. application Ser. No. 11/536,673, filed on even date herewith; U.S. application Ser. No. 11/536,679, filed on even date herewith; U.S. application Ser. No. 11/536,670, filed on even date herewith; U.S. application Ser. No. 11/536,672, filed on even date herewith; U.S. application Ser. No. 11/536,648, filed on even date herewith; U.S. application Ser. No. 11/536,669, filed on even date herewith; U.S. application Ser. No. 11/536,666, filed on even date herewith; U.S. application Ser. No. 11/536,675, filed on even date herewith; U.S. application Ser. No. 11/536,685, filed on even date herewith; U.S. application Ser. No. 11/536,645, filed on even date herewith; U.S. application Ser. No. 11/536,655, filed on even date herewith; U.S. application Ser. No. 11/536,660, filed on even date herewith; U.S. application Ser. No. 11/536,657, filed on even date herewith; U.S. application Ser. No. 11/536,662, filed on even date herewith; U.S. application Ser. No. 11/536,688, filed on even date herewith; U.S. application Ser. No. 11/536,667, filed on even date herewith; U.S. application Ser. No. 11/536,651, filed on even date herewith; U.S. application Ser. No. 11/536,656, filed on even date herewith; and U.S. application Ser. No. 11/536,663, filed on even date herewith.

The above stated applications are hereby incorporated herein by reference in their entirety.

FIELD OF THE INVENTION

Certain embodiments of the invention relate to wireless communication systems. More specifically, certain embodiments of the invention relate to a method and system for sharing components in a time division multiplex wireless system.

BACKGROUND OF THE INVENTION

As competition in the mobile device business has increased, manufacturers of mobile devices may have found themselves struggling to differentiate their respective products. Although mobile device styling may have been the preferred way of attracting consumers, manufactures are increasingly turning to adding additional features. For example, at one time a cellular telephone was only used for voice communication. But today, cellular telephones may be more akin to computers. Many run familiar applications such as calendar and email applications. Additionally, some cellular telephones include hardware and software to support GPS navigation and hands-free capability. The last two features may require the cellular telephone to support communication protocols other than the standard cellular telephone protocols.

Supporting more and more communication protocols may increase the cost and size of mobile devices. For example, the hands-free capability described above may conform to a Bluetooth standard and therefore may require additional software and hardware, to support Bluetooth functionality. For example additional PLLs, filters and power amplifiers may be needed. The GPS capabilities described above may also require dedicated hardware and software.

In addition, to cost and size, the power consumption of these mobile devices may increase as well because the extra components may consume power even when not used. For example, various PLLs corresponding to various communication protocols may be operating even though no transmission may be occurring using those communication protocols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharing components in a time division multiplex wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing components in a time division multiplex wireless system. Exemplary aspects of the invention may comprise configuring at least one component of a software programmable radio, such as a PLL, to enable communication of data using, for example, a GSM protocol during a first timeslot in a frame and reconfiguring that component to enable communication of data using a different communication protocol during an unused timeslot in the same frame. Both uplink and downlink channels of the different communication protocol may be communicated during the unused timeslots.

Figure 1:
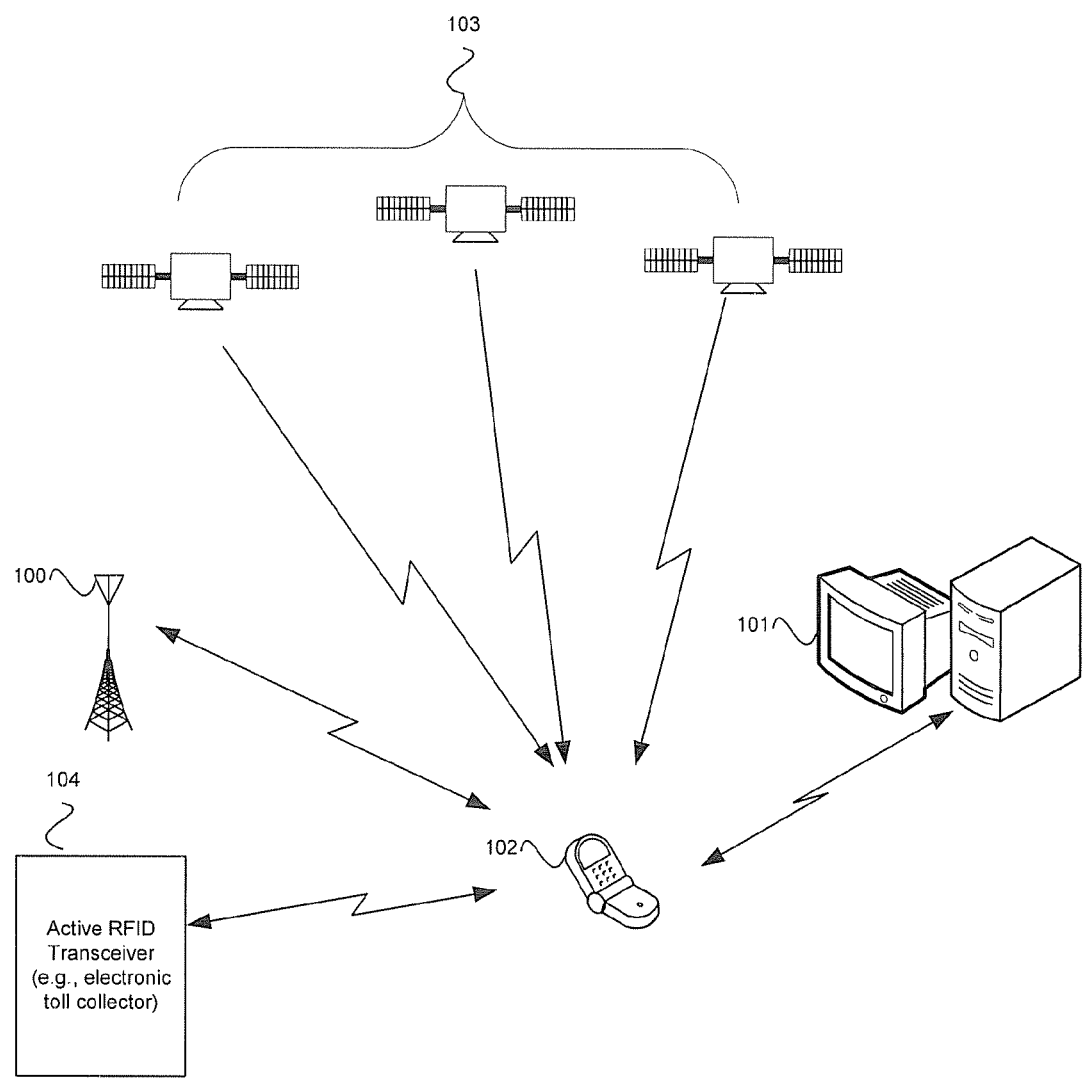
FIG. 1 is a block diagram of an exemplary mobile device communicating with a plurality of wireless systems, in accordance with an embodiment of the invention.

FIG. 1 is a block diagram of an exemplary mobile device communicating with a plurality of wireless systems, in accordance with an embodiment of the invention. Referring to FIG. 1, there is shown an RFID transceiver 104, a cellular telephone tower 100, a satellite communication system 103, a computer 101, and a mobile device 102. The RFID transceiver 104 may comprise suitable logic, circuitry, and/or code that may enable near field communication (NFC) with a mobile device. For example, the RFID transceiver 104 may be implemented as part of an electronic toll collection application in which the RFID transceiver 104 may be located at a toll plaza. In this regard, a mobile device 102 that support NFC may, for example, be used to authorize toll payments.

The cellular telephone tower 100 may comprise suitable logic, circuitry, and or code that may enable transmitting information to and receiving information from a mobile device 102. In this regard, the cellular telephone tower 100 may transmit and receive information utilizing a TDMA communication protocol, such as GSM. In this regard, information may be communicated to the mobile device 102 during timeslots. For example, one timeslot may be used to receive information from the mobile device 102 and the other may be used to transmit information to the mobile device 102. Other timeslots may be used to communicate with other mobile devices.

The satellite communication system 103 may comprise suitable logic, circuitry, and/or code that may enable a mobile device to determine its location on earth. For example, the satellite communication system 103 may be comprised of a plurality of satellites all working in concert so that a mobile device 102 may triangulate its position. In this regard, the satellite communication system 103 may be a global positioning satellite (GPS) system.

The computer 101 may comprise suitable logic, circuitry, and or code that may enable communicating data utilizing a variety of communication protocols. For example, the computer 101 may communicate data utilizing a WLAN protocol, such as 802.11, or a Bluetooth protocol. In this regard, the computer 101 may utilize these protocols to communicate to a mobile device 102. For example, the computer 101 may discover and make itself accessible to the mobile device 102. The mobile device 102 may then initiate a data transfer to the computer 101. For example, the mobile device 102 may transfer information stored in a subscriber identity module (SIM), such as an address book, to the computer utilizing one of the protocols.

The mobile device 102 may comprise suitable logic, circuitry, and/or code that may enable receiving and transmitting information utilizing a plurality of communication protocols. For example, the mobile device 102 may utilize a time division multiple access (TDMA) protocol, such as GSM, for handling voice and data calls. In this regard, the mobile device 102 may utilize two timeslots within a GSM frame to communicate voice data to a cellular telephone tower 100. The mobile device 102 may communicate to other devices utilizing other communication protocols during unused timeslots. For example, the mobile device 102 may communicate to a computer 101 utilizing a Bluetooth protocol. The mobile device 102 may also receive information, such as GPS satellite information during other timeslots as well. The mobile device 102 may also be enabled to receive NFC signals from an RFID transceiver 104.

Utilizing unused timeslots to communicate information may enable resources within the mobile device 102 to be used more efficiently. For example, a PLL may be configured to enable GSM RX operation during a first timeslot. During other timeslots where GSM operation may not be required, the PLL may be reconfigured to support other communication protocols, such as Bluetooth. Therefore, only one PLL may be necessary to support the two protocols.

Figure 2:
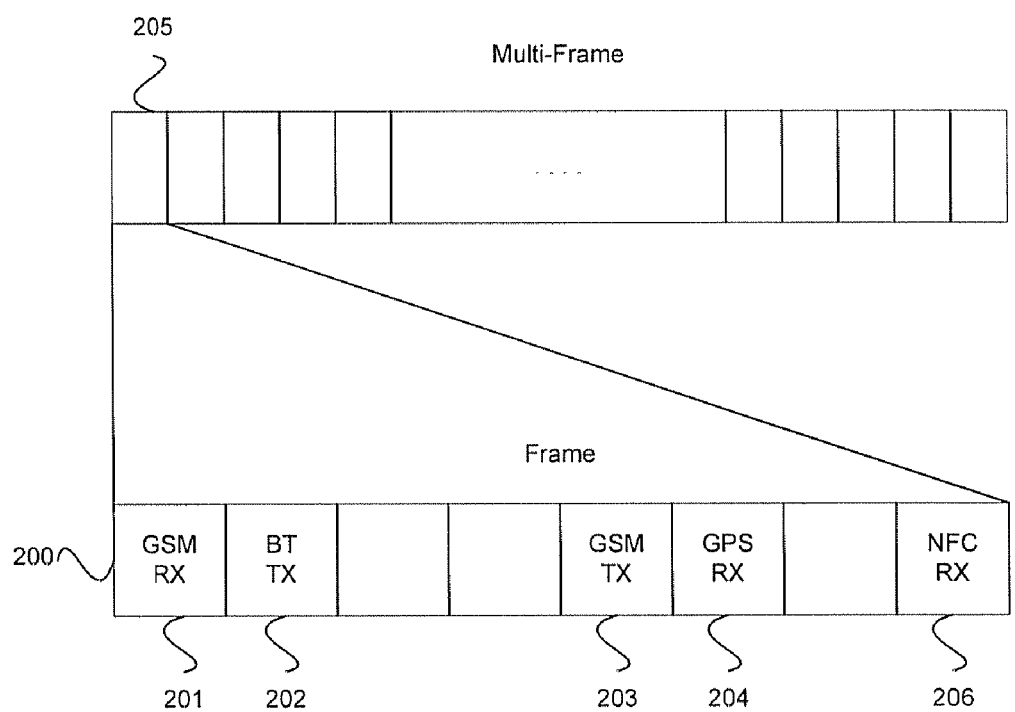
FIG. 2 is a block diagram of an exemplary time slot arrangement, in accordance with an embodiment of the invention.

FIG. 2 is a block diagram of an exemplary time slot arrangement, in accordance with an embodiment of the invention. Referring to FIG. 2, there is shown a multi-frame 205, a single frame 200, a GSM RX timeslot 201, a GSM TX timeslot 203, a Bluetooth TX timeslot 202, a GPS RX timeslot 204, and a NFC RX timeslot 206. The multi-frame 205 may conform to the GSM standard described above. In this regard, the multi-frame 205 may comprise 26 frames, where the length of each frame may be 4.16 milliseconds. Some of the frames within the multi-frame may be used to communicate data to a mobile device 102 (FIG. 1).

The single frame 200 may be one of a plurality of frames in the multi-frame 205. The single frame 200 may be divided into, for example, eight (8) timeslots. A mobile device 102 may communicate utilizing a plurality of communication protocols within the single frame 200. For example, the mobile device 102 may receive information from a cellular telephone tower 100 (FIG. 1) during the GSM RX timeslot 201 and may transmit information to a cellular telephone tower 100 during the GSM TX timeslot 203. During other timeslots, the mobile device 102 may be configured to communicate using other communication protocols. For example, the mobile device 102 may be configured to communicate to a computer using, for example a Bluetooth transmission system during the Bluetooth TX slot 202. The mobile terminal may also be configured to receive signals from a plurality of satellites during the GPS RX time slot 204. The mobile terminal may also be configured to receive signals from a radio broadcast station during the NFC RX time slot 206.

Figure 3:
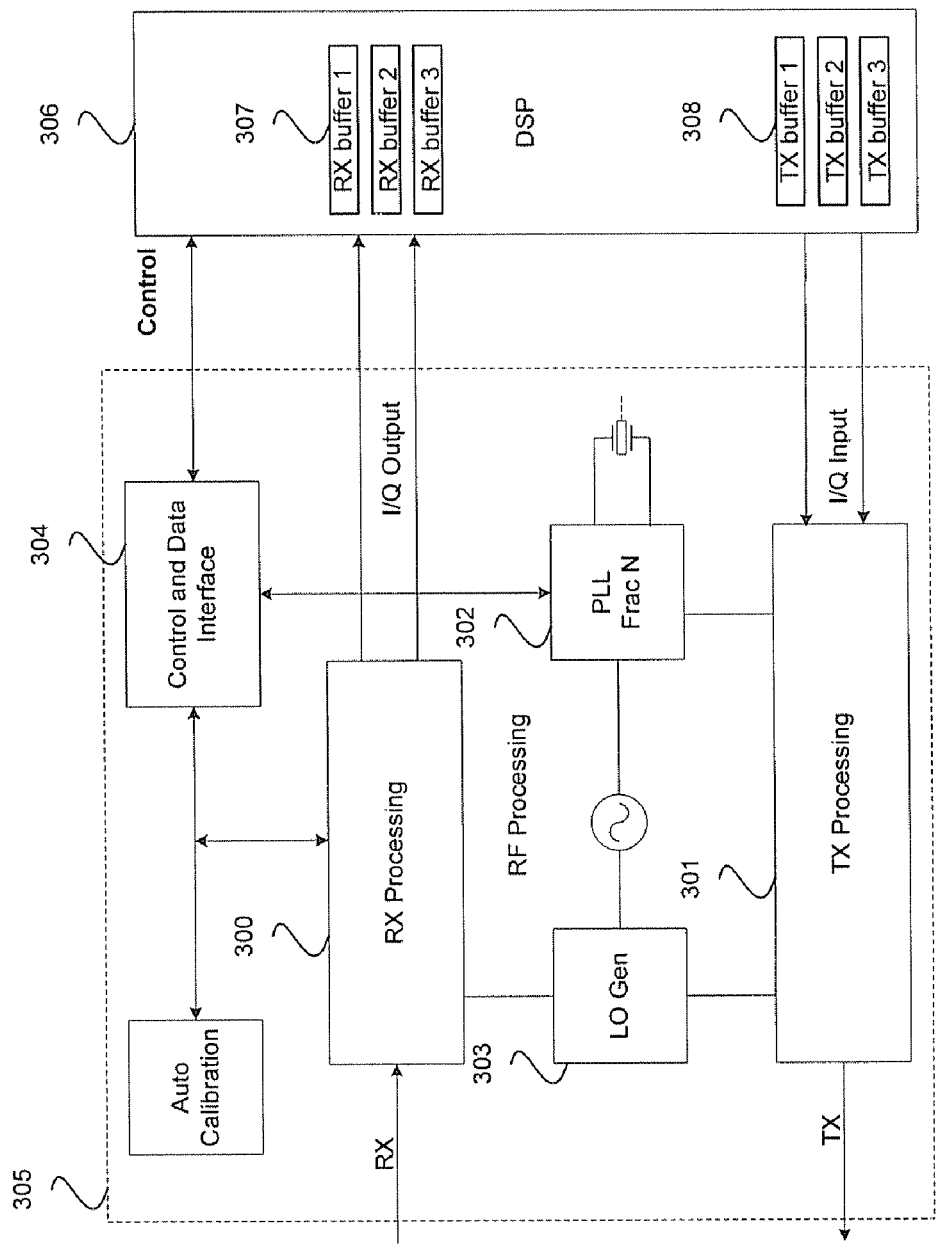
FIG. 3 is a block diagram of an exemplary system for sharing components in a time division multiplex wireless system, in accordance with an embodiment of the invention.

FIG. 3 is a block diagram of an exemplary system for sharing components in a time division multiplex wireless system, in accordance with an embodiment of the invention. Referring to FIG. 3, there is shown a software definable radio (SDR) 305 and a DSP 306. The SDR 305 may comprise a RX processing system 300, a TX processing system 301, a PLL 302, an oscillator 303, and a control block 304. The DSP 306 may comprise receive buffers 307 and transmit buffers 308.

The RX processing system 300 may comprise suitable logic, code, and/or circuitry that may enable receiving RF signals corresponding to a plurality of communication protocols. For example, the RX processing system 300 may be adapted to receive TDMA transmissions, such as GSM. The RX processing system 300 may be further adapted to receive other forms of transmissions, for example, Bluetooth, WLAN, GPS, NFC, WLAN, Zigbee, and DVB-H. In this regard, the RX processing system 300 may comprise a plurality of filters, which may be tailored so that the selected transmission may be properly received. For example, the RX processing system 300 may include a band pass filter that may in one instance be centered around a carrier frequency associated with, for example, a cellular telephone tower 100 (FIG. 1), and in another instance may be centered around a carrier frequency associated with a Bluetooth signal from a computer 101 (FIG. 1). In this regard, the RX processing system 300 may be capable of receiving RF signals corresponding to one communication protocol in one timeslot and another communication protocol in another timeslot within the same frame. The RX processing system 300 may convert the received signals into an I and Q representation for subsequent processing by, for example, a DSP.

The TX processing system 301 may comprise suitable logic, code, and/or circuitry that may enable transmitting signals corresponding to a plurality of communication protocols. For example, the TX processing system 301 may be adapted to receive I and Q representations of data to be communicated using a particular communication protocol, such as GSM. The TX processing system 301 may be further adapted to transmit other forms of transmissions, for example, Bluetooth, WLAN, GPS, NFC, WLAN, Zigbee, and DVB-H. In this regard, the TX processing system 301 may comprise a plurality of filters and an RF power amplifier that may be configured so that the data may be transmitted utilizing the proper communication protocol. For example, the TX processing system 301 may include a band pass filter that may in one instance be center around a carrier frequency associated with, for example, a cellular telephone tower 100, and in another instance may be centered around a carrier frequency associated with a Bluetooth signal from a computer 101. In this regard, the TX processing system 301 may be capable of transmitting RF signals corresponding to one communication protocol in one timeslot and another communication protocol in another timeslot within the same frame.

The oscillator 303 may comprise suitable logic, circuitry, and/or code that may enable generation of a local oscillator signal with a particular frequency. The local oscillator signal from the oscillator 303 may be input the RX processing system 300, the TX processing system 301 and the PLL 302. For example, the local oscillator signal may be used as the reference for a quadrature phase demodulator that may reside within the RX processing system 300. In this regard, the demodulator may shift the carrier frequency of a received RX signal down to a baseband carrier frequency so that the RX signal may be converted into an I and Q domain.

The PLL 302 may comprise suitable logic, circuitry and/or code that may enable generating an output frequency that may be a multiple of an input frequency. For example, the PLL 302 may be a fractional N synthesizer. In this regard, the PLL may effectively generate an output signal that may have a frequency that may be a non-integer multiple of the frequency of an input signal, such as the output of the oscillator 303. For example, if the oscillator 303 frequency is 1 MHz, the output of the PLL may be $$1\text{Mhz} * \frac{M}{N}$$

where M and N may be integers. In this way, the PLL may be configured to output a plurality of frequencies that may enable communicating information utilizing a plurality of communication protocols.

The control block 304 may comprise suitable logic, circuitry, and/or code that may enable configuration of a plurality of components within a SDR. For example, the control block 304 may comprise a plurality of registers. The registers may in turn be used to control the functionality of the various components that make up the SDR 305. In this regard, the control block 304 may be interfaced to a data bus connected to the DSP 304 so that the DSP 304 may read and write to registers within the control block 304. The control block 304 may also control which of a plurality of communication protocols may be used at any given time. For example, the control block 304 may comprise a timer for triggering events. The events may be used to reconfigure the various components of the SDR 305 at specific time. In an exemplary embodiment of the invention, a first event may be used to configure the SDR 305 so that a first timeslot may be used as GSM TX timeslot 203 (FIG. 2). A subsequent event may reconfigure the SDR 305 so that a second timeslot may be used, for example, as a Bluetooth TX timeslot 202 (FIG. 2). Having the controller perform this function may reduce the processing power requirements of the DSP 304.

The DSP 304 may comprise suitable logic, circuitry and/or code that may enable may enable sending and receiving I and Q data to and from the SDR 305 as well as suitable logic, circuitry and/or code that may enable configuring the SDR 305. In this regard, the DSP 304 may convert data from various sources into I and Q information and visa versa. The DSP 304 may maintain information to be transmitted in a buffer until the SDR 305 may be ready to send the information. In this regard, the DSP 304 may comprise a plurality of transmit and receive buffers 308 and 307 corresponding to a plurality of communication protocols.

An event from the Control block may be communicated to the DSP 304 that may indicate to the DSP 304 which type of I and Q data to send or receive. For example, the control block may communicate an event to the DSP 304 indicating that the next time slot in, for example, a GSM frame may be used to transmit Bluetooth data. In this case, the DSP 304 may switch to a buffer 308 corresponding to Bluetooth data and begin communicating I and Q samples corresponding to Bluetooth data to the SDR 305 after the event occurs. The control block may then communicate to the DSP 304 that the next slot may, for example, be utilized to communicate GSM TX information. The DSP may then switch over to a buffer 308 corresponding to GSM TX data and output I and Q samples corresponding to that data to the SDR 305.

Figure 4:
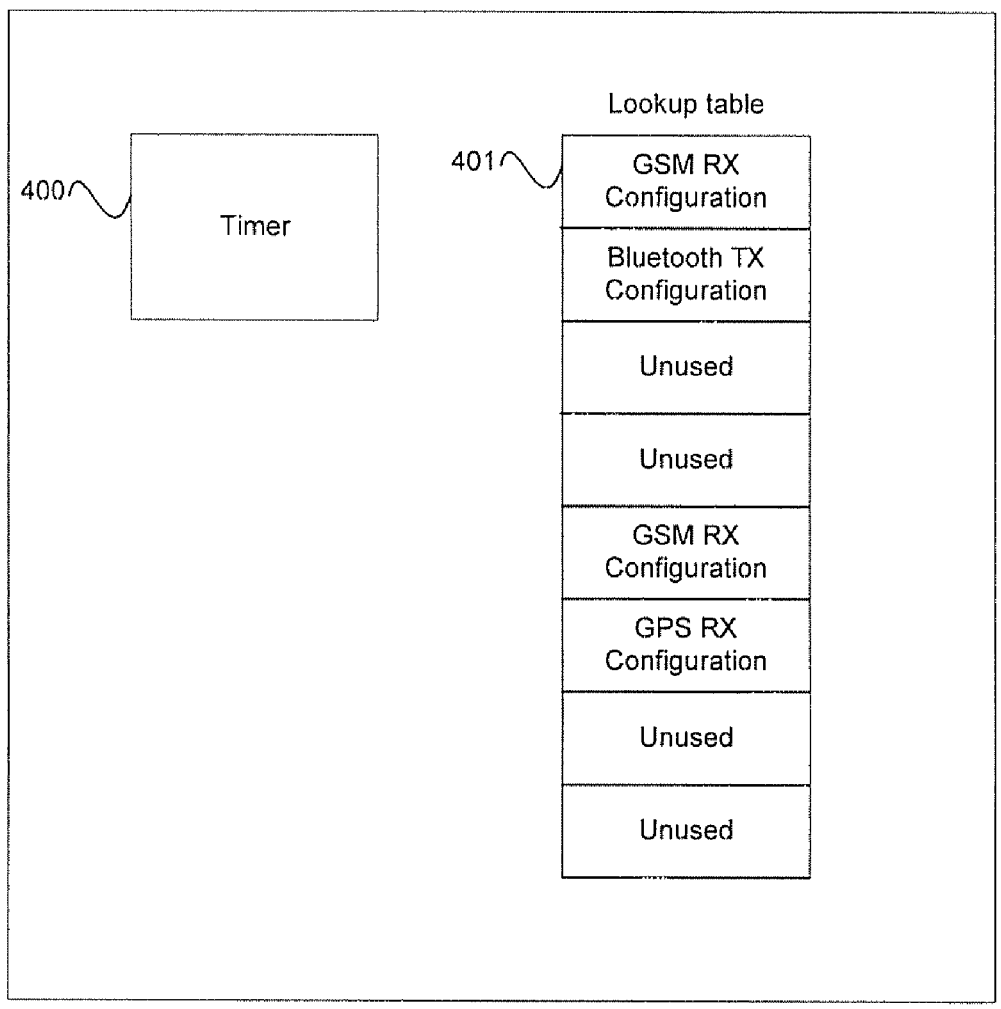
FIG. 4 is a block diagram of an exemplary control and data interface, in accordance with an embodiment of the invention.

FIG. 4 is a block diagram of an exemplary control and data interface, in accordance with an embodiment of the invention. Referring to FIG. 4, there is shown a timer 400 and a lookup table 401. The timer may comprise suitable logic, circuitry, and/or code that may enable generation of periodic events. In this regard, the periodicity of the timer and when events occur may be configured by a processor, such as a DSP 306. The lookup table 401 may comprise suitable logic, circuitry, and/or code that may enable storing various hardware configuration settings corresponding to specific timeslots. For example, the first element in the lookup table 401 may comprise hardware configuration settings to be utilized during a first time slot in a TDMA frame. The subsequent elements may correspond to other timeslots within the same TDMA frame.

In operation, a DSP 306 (FIG. 3) may configure the timer, for example, to generate 8 timeslot event over a period of, for example, 4.16 milliseconds. In addition, a DSP may program the lookup table 401 with configuration settings for a plurality of hardware components. The configuration settings may be settings that enable the hardware components within the SDR 305 (FIG. 3) to process specific communication protocols. For example, the first element in the lookup table may comprise configuration settings that may enable GSM reception. The second element in the lookup table may comprise configuration settings that may enable Bluetooth transmission. In operation, the timer may output the configuration settings stored in the lookup time for every timeslot. For example, during a first timeslot the GSM reception configuration settings may be output. During the second timeslot the Bluetooth transmission configuration settings may be output. In this manner, the control block may autonomously reconfigure the various hardware components, such as the RX processing system 300 (FIG. 3), the TX processing system 301 (FIG. 3), the PLL 302 (FIG. 3), and the oscillator 303 (FIG. 3). Reconfiguring the components for use with the various communication protocols may reduce the cost of the system because fewer components may be needed. This may result in a reduction in the board area required in a mobile device 102 (FIG. 1). Additionally, power consumption may be reduced because the components may not be spending as much time in an idle mode.

Figure 5:
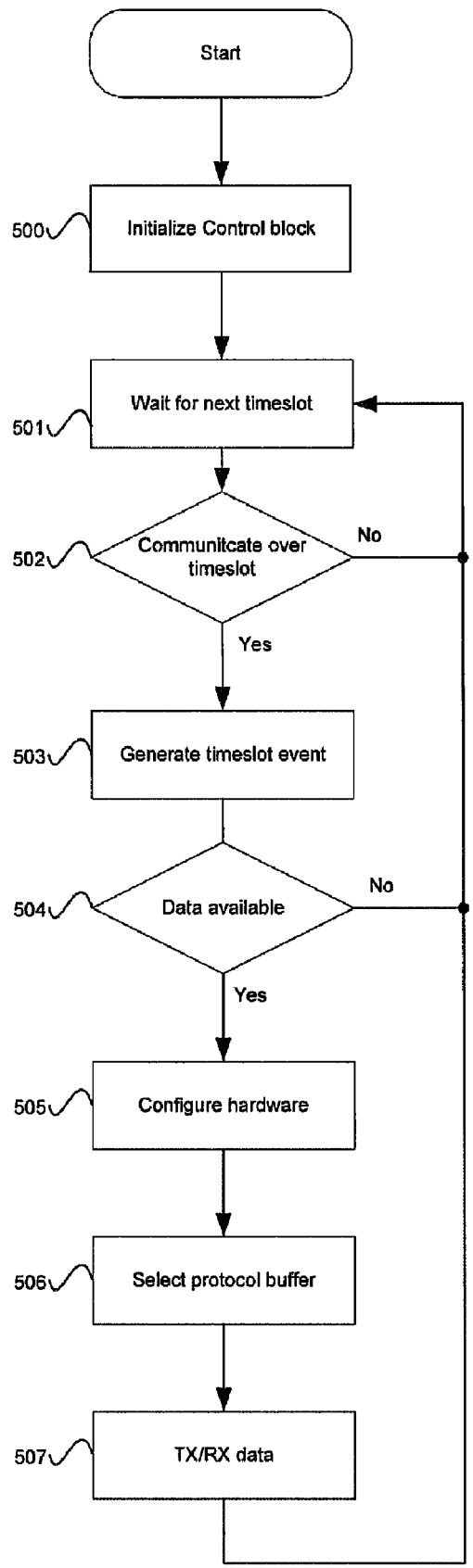
FIG. 5 is a block diagram illustrating an exemplary flow diagram of a system for sharing components in a time division multiplex wireless system, in accordance with an embodiment of the invention.

FIG. 5 is a block diagram illustrating an exemplary flow diagram of a system for sharing components in a time division multiplex wireless system, in accordance with an embodiment of the invention. Referring to FIG. 5, in step 500 the DSP 306 (FIG. 3) may initialize the control block 304 (FIG. 3) in the SDR 305 (FIG. 3). This may involve configuring a timer 400 (FIG. 4) for generating timeslot events. In this regard, the DSP 306 may, for example, configure the timer 400 so that the timer 400 generates a specific number of timeslot events over a given period of time. For example, the DSP 306 may configure the timer 400 so that it generates 8 timeslot events evenly distributed over, for example, 4.16 milliseconds. The DSP 306 may also configure the control block 304 so that the control block 304 may control the various hardware components within the SDR 305. For example, the DSP 306 may configure the control block 304 so that a first timeslot may be used for GSM RX 201 (FIG. 2) and a second timeslot may be used for BT TX 202 (FIG. 2). For example, the control block 304 may comprise a lookup table 401 (FIG. 4) of configuration settings. Each entry in the lookup table 401 may contain various hardware configuration settings that may correspond to a particular timeslot within a TDMA frame, such as a GSM frame.

At step 501, the DSP 306 may wait for the next timeslot. At step 502, the control block 304 may send a timeslot event for a particular timeslot if, for example, that timeslot may have been enabled for communication. If the communication over the current timeslot has been enabled, the control block 304 may generate a timeslot event to the DSP 306 at step 503. Otherwise, step 501 may be repeated. At step 504, the DSP 306 may check if there may be any data to communicate. For example, in the case of data transmission, the DSP 306 may poll various buffers 308 (FIG. 3) corresponding to various communication protocols to determine whether data needs to be communicated. In the case of data reception, the DSP 306 may check for I and Q data from the RX processing system 300 of the SDR 305. If no communication is necessary, then step 501 may be repeated.

At step 505, the control block 304 may configure various hardware components to enable communication for a particular protocol. For example, the current timeslot may have previously been configured for GSM RX 201. In this case, the control block 304 may configure, for example, various filters, a PLL 302, and a local oscillator 303 with values stored in a lookup table corresponding to the current timeslot. At step 506, the DSP 306 may communicate I and Q data to the TX processing system 301 of the SDR 305 in the case of data transmission, or the RX processing system 300 of the SDR 305 may communicate I and Q data to the DSP 306 in the case of data reception. After this, step 500 may be repeated.

Another embodiment of the invention may provide a machine-readable storage, having stored thereon, a computer program having at least one code section executable by a machine, thereby causing the machine to perform the steps as described herein for communicating information in a multi-antenna system. For example, one or more of the RX processing system 300, a TX processing system 301, a PLL 302, an oscillator 303, a control block 304, and the DSP 306 may be controlled by code such as software and/or firmware.

Another embodiment of the invention may provide a method for performing the steps as described herein for communicating information in a multi-antenna system. For example, one or more of the RX processing system 300, a TX processing system 301, a PLL 302, an oscillator 303, a control block 304, and the DSP 306 may be controlled by such a method.

Yet another embodiment may provide a system with one or more circuits that may enable the system to perform the steps as described herein for communicating information in a multi-antenna system. For example, one or more of the RX processing system 300, a TX processing system 301, a PLL 302, an oscillator 303, a control block 304, and the DSP 306 may be controlled by circuitry such as a processor and memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
configuring at least one component of a software programmable radio to communicate using a first communication protocol during a first timeslot in a TDMA frame; and
reconfiguring said at least one component of said software programmable radio to communicate using a second communication protocol during at least a second timeslot in said TDMA frame, wherein said first communication protocol is different than said second communication protocol.

2. The method according to claim 1, wherein said at least a second timeslot is unused by said first communication protocol.

3. The method according to claim 1, wherein said at least a second timeslot comprises at least one of: a downlink channel or an uplink channel.

4. The method according to claim 1, comprising configuring a phase locked loop (PLL) to output a frequency corresponding to said first communication protocol.

5. The method according to claim 1, comprising configuring a phase locked loop (PLL) to output a frequency corresponding to said second communication protocol.

6. The method according to claim 1, comprising configuring at least one of: a band pass filter, an RX processing system, a TX processing system, and a local oscillator to enable communication of information using said first communication protocol.

7. The method according to claim 1, comprising configuring at least one of: a band pass filter, an RX processing system, a TX processing system, and a local oscillator to enable communication of information using said second communication protocol.

8. The method according to claim 1, wherein said TDMA frame is at least one of: a GSM frame, a GPRS frame, an EDGE frame, a compressed WCDMA frame, a WIMAX frame, and 4G frame.

9. The method according to claim 1, wherein said first communication protocol conforms to at least one of: GSM, GPRS, EDGE, compressed WCDMA, WIMAX, and 4G.

10. The method according to claim 1, wherein said second communication protocol conforms to at least one of: a Bluetooth standard, a GPS standard, a NFC standard, a WLAN standard, a Zigbee standard, and a DVB-H standard.

11. A non-transitory machine-readable storage having stored thereon, a computer program having at least one code section for processing signals in a communication system, the at least one code section being executable by a machine for causing the machine to perform steps comprising:
configuring at least one component of a software programmable radio to communicate using a first communication protocol during a first timeslot in a TDMA frame; and
reconfiguring said at least one component of said software programmable radio to communicate using a second communication protocol during at least a second timeslot in said TDMA frame, wherein said first communication protocol is different than said second communication protocol.

12. The machine-readable storage according to claim 11, wherein said at least a second timeslot is unused by said first communication protocol.

13. The machine-readable storage according to claim 11, wherein said at least a second timeslot comprises at least one of: a downlink channel or an uplink channel.

14. The machine-readable storage according to claim 11, wherein said at least one code section comprises code that enables configuring a phase locked loop (PLL) to output a frequency corresponding to said first communication protocol.

15. The machine-readable storage according to claim 11, wherein said at least one code section comprises code that enables configuring a PLL to output a frequency corresponding to said second communication protocol.

16. The machine-readable storage according to claim 11, wherein said at least one code section comprises code that enables configuring at least one of: a band pass filter, an RX processing system, a TX processing system, and a local oscillator to enable communication of information using said first communication protocol.

17. The machine-readable storage according to claim 11, wherein said at least one code section comprises code that enables configuring at least one of: a band pass filter, an RX processing system, a TX processing system, and a local oscillator to enable communication of information using said second communication protocol.

18. The machine-readable storage according to claim 11, wherein said TDMA frame is at least one of: a GSM frame, a GPRS frame, an EDGE frame, a compressed WCDMA frame, a WIMAX frame, and 4G frame.

19. The machine-readable storage according to claim 11, wherein said first communication protocol conforms to at least one of: GSM, GPRS, EDGE, compressed WCDMA, WIMAX, and 4G.

20. The machine-readable storage according to claim 11, wherein said second communication protocol conforms to at least one of: a Bluetooth standard, a GPS standard, a NFC standard, a WLAN standard, a Zigbee standard, and a DVB-H standard.

21. A system for processing signals in a communication system, the system comprising:
one or more circuits that enables configuring of at least one component of a software programmable radio to communicate using a first communication protocol during a first timeslot in a TDMA frame; and
said one or more circuits enables reconfiguring of said at least one component of said software programmable radio to communicate using a second communication protocol during at least a second timeslot in said TDMA frame, wherein said first communication protocol is different than said second communication protocol.

22. The system according to claim 21, wherein said at least a second timeslot is unused by said first communication protocol.

23. The system according to claim 21, wherein said at least a second timeslot comprises at least one of: a downlink channel or an uplink channel.

24. The system according to claim 21, wherein said one or more circuits enables configuring a phase locked loop (PLL) to output a frequency corresponding to said first communication protocol.

25. The system according to claim 21, wherein said one or more circuits enables configuring a phase locked loop (PLL) to output a frequency corresponding to said second communication protocol.

26. The system according to claim 21, wherein said one or more circuits enables configuring at least one of: a band pass filter, an RX processing system, a TX processing system, and a local oscillator to enable communication of information using said first communication protocol.

27. The system according to claim 21, wherein said one or more circuits enables configuring at least one of: a band pass filter, an RX processing system, a TX processing system, and a local oscillator to enable communication of information using said second communication protocol.

28. The system according to claim 21, wherein said TDMA frame is at least one of: a GSM frame, a GPRS frame, an EDGE frame, a compressed WCDMA frame, a WIMAX frame, and 4G frame.

29. The system according to claim 21, wherein said first communication protocol conforms to at least one of: GSM, GPRS, EDGE, compressed WCDMA, WIMAX, and 4G.

30. The system according to claim 21, wherein said second communication protocol conforms to at least one of: a Bluetooth standard, a GPS standard, a NFC standard, a WLAN standard, a Zigbee standard, and a DVB-H standard.

* * * * *